US008892789B2

(12) United States Patent
Spry

(10) Patent No.: US 8,892,789 B2
(45) Date of Patent: Nov. 18, 2014

(54) ACCELERATING INTERNET SMALL COMPUTER SYSTEM INTERFACE (ISCSI) PROXY INPUT/OUTPUT (I/O)

(75) Inventor: Andrew J. Spry, Wichita, KS (US)

(73) Assignee: Netapp, Inc., Sunnyvale, CA (US)

( * ) Notice: Subject to any disclaimer, the term of this patent is extended or adjusted under 35 U.S.C. 154(b) by 1142 days.

(21) Appl. No.: 12/317,151

(22) Filed: Dec. 19, 2008

(65) Prior Publication Data
US 2010/0161843 A1 Jun. 24, 2010

(51) Int. Cl.
G06F 13/28 (2006.01)
G06F 13/00 (2006.01)
H04L 29/08 (2006.01)

(52) U.S. Cl.
CPC .................. H04L 67/1097 (2013.01)
USPC ............................... 710/33; 710/22

(58) Field of Classification Search
None
See application file for complete search history.

(56) References Cited

U.S. PATENT DOCUMENTS

| 6,023,731 | A  | * | 2/2000  | Chawla          | 709/231 |
|-----------|----|---|---------|-----------------|---------|
| 6,195,676 | B1 | * | 2/2001  | Spix et al.     | 718/107 |
| 6,681,232 | B1 | * | 1/2004  | Sistanizadeh et al. | 1/1 |
| 7,093,288 | B1 | * | 8/2006  | Hydrie et al.   | 726/13  |
| 7,281,062 | B1 | * | 10/2007 | Kuik et al.     | 709/249 |
| 7,299,266 | B2 | * | 11/2007 | Boyd et al.     | 709/213 |
| 7,519,769 | B1 | * | 4/2009  | Kulkarni et al. | 711/114 |
| 7,617,256 | B2 | * | 11/2009 | Mohamed et al.  | 1/1     |
| 7,808,996 | B2 | * | 10/2010 | Chung et al.    | 370/392 |
| 2002/0049825 | A1 | * | 4/2002 | Jewett et al.   | 709/215 |
| 2002/0095602 | A1 | * | 7/2002 | Pherson et al.  | 713/201 |
| 2002/0188697 | A1 | * | 12/2002 | O'Connor        | 709/219 |
| 2003/0026254 | A1 | * | 2/2003 | Sim             | 370/392 |
| 2003/0123274 | A1 | * | 7/2003 | Camble et al.   | 365/100 |
| 2003/0145045 | A1 | * | 7/2003 | Pellegrino et al. | 709/203 |
| 2003/0214525 | A1 | * | 11/2003 | Esfahany       | 345/700 |
| 2003/0237016 | A1 | * | 12/2003 | Johnson et al.  | 714/4   |
| 2004/0028043 | A1 | * | 2/2004 | Maveli et al.   | 370/392 |
| 2004/0093411 | A1 | * | 5/2004 | Elzur et al.    | 709/224 |
| 2005/0015471 | A1 | * | 1/2005 | Zhang et al.    | 709/221 |
| 2005/0246453 | A1 | * | 11/2005 | Erlingsson et al. | 710/1 |
| 2005/0281261 | A1 | * | 12/2005 | Zur et al.     | 370/389 |
| 2006/0031602 | A1 | * | 2/2006 | Ellis et al.    | 710/22  |
| 2006/0101224 | A1 | * | 5/2006 | Shah et al.     | 711/173 |
| 2006/0112219 | A1 | * | 5/2006 | Chawla et al.   | 711/114 |
| 2006/0165084 | A1 | * | 7/2006 | Makhervaks et al. | 370/394 |
| 2006/0195663 | A1 | * | 8/2006 | Arndt et al.    | 711/153 |
| 2006/0235977 | A1 | * | 10/2006 | Wunderlich et al. | 709/227 |
| 2006/0277383 | A1 | * | 12/2006 | Hayden et al.   | 711/170 |

(Continued)

Primary Examiner — Henry Tsai
Assistant Examiner — Christopher Bartels
(74) Attorney, Agent, or Firm — Haynes and Boone, LLP

(57) ABSTRACT

The present invention is a method for accelerating proxy Input/Output (proxy I/O). The method includes the step of receiving a command at a primary target storage system. The primary target storage system may be part of a clustered storage array. The command may be a command which was transmitted by an initiator system via a storage area network, and may include a request for data. The method further includes the step of forwarding the command to a session layer of the primary target storage system. Further, when a virtualization layer of the primary target storage system determines that a portion of the data requested in the data request is not stored by the primary target storage system, but is stored by a proxy target storage system included in the plurality of storage systems, the method further includes providing a proxyIO request to a proxy initiator of the primary target storage system. Further, the method may further include, based on the proxyIO request, generating a proxyDataIn request and providing the proxyDataIn request to an I/O controller for the primary target storage system.

20 Claims, 4 Drawing Sheets

(56) References Cited

U.S. PATENT DOCUMENTS

| | | | |
|---|---|---|---|
| 2006/0282457 A1* | 12/2006 | Williams | 707/102 |
| 2007/0050544 A1* | 3/2007 | Chawla et al. | 711/114 |
| 2007/0050765 A1* | 3/2007 | Geisinger | 718/1 |
| 2007/0067435 A1* | 3/2007 | Landis et al. | 709/224 |
| 2007/0112931 A1* | 5/2007 | Kuik et al. | 709/216 |
| 2007/0127525 A1* | 6/2007 | Sarangam et al. | 370/469 |
| 2007/0192466 A1* | 8/2007 | Nahum | 709/223 |
| 2007/0233809 A1* | 10/2007 | Brownell et al. | 709/218 |
| 2007/0245060 A1* | 10/2007 | Lakkavalli | 711/100 |
| 2008/0140958 A1* | 6/2008 | Yates et al. | 711/161 |
| 2009/0113110 A1* | 4/2009 | Chen et al. | 711/6 |
| 2009/0183057 A1* | 7/2009 | Aizman | 714/807 |
| 2010/0138642 A1* | 6/2010 | Cherian et al. | 713/2 |

* cited by examiner

US 8,892,789 B2

ACCELERATING INTERNET SMALL COMPUTER SYSTEM INTERFACE (ISCSI) PROXY INPUT/OUTPUT (I/O)

FIELD OF THE INVENTION

The present invention relates to the field of network storage clusters which implement the Internet Small Computer System Interface (iSCSI) block storage protocol. and particularly to a system and method for accelerating iSCSI proxy Input/Output (I/O).

BACKGROUND OF THE INVENTION

Currently available systems/methods for providing block storage clustering may not provide a desired level of performance.

Therefore, it may be desirable to provide system(s)/method(s) for providing block storage clustering which address the above-referenced problems of currently available solutions.

SUMMARY OF THE INVENTION

Accordingly, an embodiment of the present invention is directed to a method for accelerating proxy Input/Output (proxy I/O), including: receiving a command at a primary target storage system included in a plurality of storage systems of a clustered storage array, the command being transmitted by an initiator system to the primary target storage system via a storage area network, the command including a request for data; forwarding the command to a session layer of the primary target storage system; when a virtualization layer of the primary target storage system determines that a portion of the data requested in the data request is not stored by the primary target storage system, but is stored by a proxy target storage system included in the plurality of storage systems, providing a proxyIO request to a proxy initiator of the primary target storage system; and based on the proxyIO request, generating a proxyDataIn request and providing the proxyDataIn request to an I/O controller for the primary target storage system.

An additional embodiment of the present invention is directed to a computer-readable medium having computer-executable instructions for performing a method for accelerating proxy Input/Output (proxy I/O), said method including: receiving a command at a primary target storage system included in a plurality of storage systems of a clustered storage array, the command being transmitted by an initiator system to the primary target storage system via a storage area network, the command including a request for data; forwarding the command to a session layer of the primary target storage system; when a virtualization layer of the primary target storage system determines that a portion of the data requested in the data request is not stored by the primary target storage system, but is stored by a proxy target storage system included in the plurality of storage systems, providing a proxyIO request to a proxy initiator of the primary target storage system; and based on the proxyIO request, generating a proxyDataIn request and providing the proxyDataIn request to an I/O controller for the primary target storage system.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Figure 1:
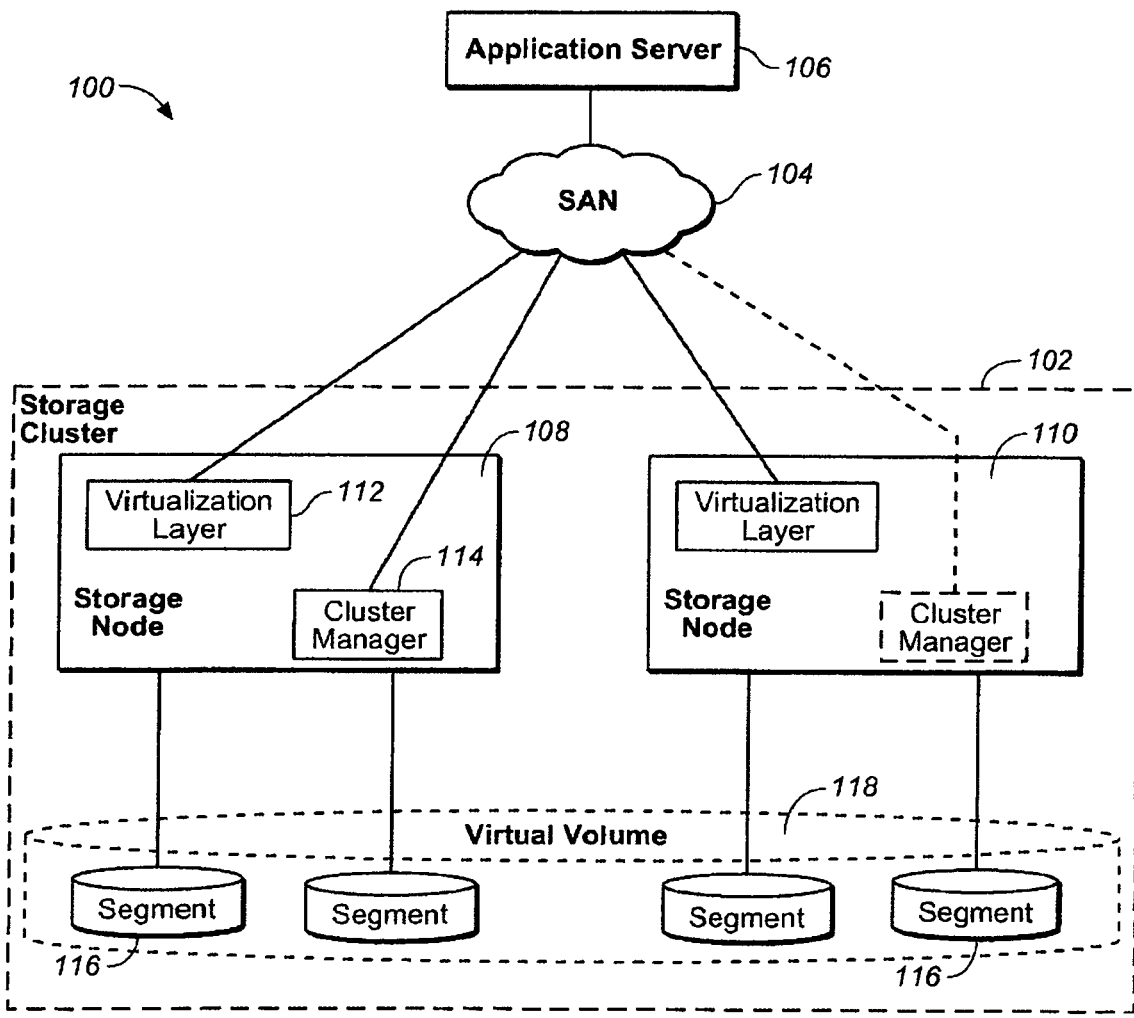
FIG. 1 is a block diagram schematic of a target-based block storage cluster system via which a method for performing accelerated proxy 110 in accordance with an exemplary embodiment of the present invention may be implemented.

Reference will now be made in detail to the presently preferred embodiments of the invention, examples of which are illustrated in the accompanying drawings.

Storage clusters may be built from two or more storage nodes connected to a storage area network (SAN). A virtualization function may combine storage resources on multiple storage nodes into virtual volumes. The virtual volumes may have a single address space, capacity which may exceed the capacity of any storage node, and performance which may exceed the performance of a single storage node. Applications on systems connected to the same SAN may use virtual volumes as their storage resources. The storage nodes and the virtualization function may create a logical system called the storage cluster, which provides virtual volumes to applications.

A storage cluster architecture may include an application server that runs applications which use virtual volumes. An SAN may connect application servers and storage nodes. The SAN may provide a network transport protocol for sending commands, data, and responses between application servers and storage nodes. The storage nodes may contain physical disks which compose the storage cluster's storage resources. The virtualization function may be built from two components: a cluster manager; and a virtualization layer. The cluster manager may have three major responsibilities. First, the cluster manager discovers all storage resources on storage nodes in the cluster. Second, the cluster manager provides an interface for creating virtual volume definitions from storage resources or their segments. Finally, the cluster manager provides a management protocol which distributes the virtual volume definitions to the virtualization layer. The virtualization layer has one primary responsibility: it sits in the block storage protocol stack and implements the virtual volume definitions. Below the virtualization layer in the block storage protocol stack, the physical storage resources are visible. Above the virtualization layer in the block storage protocol stack, only virtual volumes are visible.

Storage clusters may be implemented using block storage protocols, file storage protocols, and object storage protocols. Block storage clusters may use any Small Computer System Interface (SCSI) transport protocols, such as iSCSI, Fibre Channel, Serial Attached SCSI (SAS), etc. Block storage clusters may be divided into three major classes differentiated by where the virtualization layer is implemented in the architecture. The virtualization layer may be placed in the initiator driver on the application server (initiator-based block storage clusters), in network appliances on the SAN (SAN-based block storage clusters), and/or in the target driver on the storage nodes (target-based block storage clusters/target-based clustering).

In an initiator-based block storage cluster, the SCSI initiator protocol stack on the application server is augmented with the virtualization layer. In this deployment, the virtualization layer must mask the physical disks exported by the storage nodes. These physical disks are visible on the SAN for discovery by the cluster manager and access by the virtualization layer. Application servers or other systems on the SAN must not be allowed to use the physical volumes directly, otherwise data corruption may occur. The cluster manager may be placed on separate redundant systems on the attached to the SAN. The logical storage cluster may include the lower levels of the application server's SCSI protocol stack in this deployment.

In an SAN-based block storage cluster, the SAN is augmented with virtualization appliances which include the virtualization layer. The virtual appliance(s) may logically divide the network into two halves. On one half, the physical disks exported by the storage nodes are visible. On the other half, only virtual volumes created by the virtualization layer are visible. The virtualization appliance may act as an SCSI target for application servers and as an SCSI initiator to the storage nodes. As with the initiator-based block storage cluster, the cluster manager is placed on separate redundant systems attached to the SAN. The cluster manager resides on the half of the SAN where the physical disks are visible. The logical storage cluster includes the virtualization appliances in the SAN in this deployment.

In a target-based block storage cluster, the SCSI target protocol stack on the storage node is augmented with the virtualization layer. The virtualization layer exports only virtual volumes to the SAN. The virtualization layer uses two techniques to handle I/O requests for data that is not resident on the storage node on which the request was received: proxy I/O and I/O forwarding/command forwarding. In proxy I/O, the SAN is used to send proxy I/O commands to other storage nodes to retrieve data for an I/O request. In command forwarding, a private data network between storage nodes is used to move data between storage nodes as needed to satisfy an I/O request. In the target-based block storage cluster implementation, the cluster manager/cluster manager component resides directly on the storage nodes. This provides redundant cluster managers for the storage cluster.

The initiator-based block storage cluster has the following advantages: maximum virtual volume capacity is limited only by the total cluster storage capacity; the storage cluster may use storage nodes of different types from different vendors; the virtualization layer adds no latency and little overhead to data transfers; and the SAN is not changed. However, the initiator-based block storage cluster has the following disadvantages: addition of redundant cluster manager systems to the infrastructure adds cost and complexity; the virtualization layer must be ported to each application server operating system; the virtualization layer must mask physical volumes from applications; the virtualization layer may need to use undocumented interfaces to mask physical volumes; the virtualization layer consumes resources that could be used by applications; the virtualization layer modifies the application server's SCSI protocol stack; and physical volumes are visible on the SAN. Further, initiator-based storage clustering may be unacceptable in installations which prefer to tightly control changes to the application server(s) and its/their operating system components. Still further, issues with incomplete masking of physical volumes or access to physical volumes by other systems not running the virtualization layer may result in data corruption.

The SAN-based block storage cluster has the following advantages: the application server SCSI protocol stack and operating system are not changed; the virtualization layer adds no latency and little overhead to data transfers; and the storage cluster may use storage nodes of different types from different vendors. However, the SAN-based block storage cluster has the following disadvantages: addition of redundant cluster manager systems to the infrastructure adds cost and complexity; addition of virtualization appliances adds cost and increases network complexity; physical volumes are visible on the SAN; network cabling or zoning errors may expose physical volumes to application servers; and the maximum virtual volume capacity is limited by the virtualization appliance. Further, although physical disks may be segregated to only part of the SAN, errors in cabling or zoning may make these disks accessible, thereby raising the potential for data corruption. Still further, each virtualization appliance has a limited number of ports and forms a virtualization domain in the cluster. Additionally, the largest virtual volume that can be created in a SAN-based cluster is limited to the maximum capacity of all storage nodes attached to a single virtualization appliance.

The target-based block storage cluster has the following advantages: the maximum virtual volume capacity is limited only by the total cluster storage capacity; the application server SCSI protocol stack and operating system are not changed; the SAN is not changed; physical disks are never visible on the SAN; and the cluster manager may be moved to the storage node to reduce cost. Further, because physical disks are not exported to the SAN in the target-based block storage cluster implementation, the potential of data corruption due to direct access of physical disks is eliminated. However, the target-based block storage cluster has the following disadvantages: the use of proxy I/O adds significant latency and overhead to data transfers when the request is sent to the wrong storage node; the use of proxy I/O doubles the network traffic on the SAN when the request is sent to the wrong storage node; the use of a private data network for command forwarding to reduce the latency and bandwidth penalty for misdirected I/O adds cost to the storage cluster; the use of a private data network may limit the total number of cluster nodes and therefore, may limit the maximum capacity of the virtual volume; and storage nodes are usually restricted to those from a single vendor.

As mentioned above, target-based block storage cluster implementations which use proxy I/O on the storage network versus target-based block storage cluster implementations which use command forwarding trade off cost and latency disadvantages. Target-based block storage clusters/target-based storage clusters using proxy I/O over the SAN have three significant advantages over other approaches: the application server and SAN do not require modification, thereby minimizing risk; no additional systems need to be added to the infrastructure, thereby minimizing cost; and the virtual volume capacity is limited only by total cluster size. However, target-based storage clusters which use proxy I/O have two significant disadvantages compared to other approaches: misdirected I/O consumes double the bandwidth on the SAN; and misdirected I/O suffers added store and forward latency. The added bandwidth requirement may be addressed by building a more capable network fabric. The present invention addresses the above-described store and forward latency disadvantage by providing an accelerated proxy I/O technique.

An example of the high level operation of a read I/O in a block storage cluster using proxy I/O will be described. A data request from an application server to the storage cluster may include the following steps: 1.) a SCSI command may be sent from the application server (ex.—initiator) to any storage node (ex.—primary node/primary target) in the cluster, the virtualization layer on the storage node (ex.—on the primary node) may determine that some or all of the data requested in the data request resides on a different storage node; 2.) using the SAN, a SCSI command (ex.—proxy I/O command/proxy I/O) is sent from the primary node to another storage node (ex.—secondary node/secondary target) in the cluster, the proxy I/O being a request for the data of the original data request which is located on the secondary node; 3.) using the SAN, the secondary node sends the requested data to temporary buffers in the primary node; 4.) the primary node relays the data from its temporary buffers to the initiator; 5.) using the SAN, the secondary node returns the final status to the primary node in a SCSI response; and 6) the primary node accumulates the SCSI responses from all local and proxy I/O operations, and returns a final status to the initiator. Steps 2, 3 and 5 above constitute a proxy I/O/proxy I/O operation/proxy I/O sequence. Any command from an application server may require one or more proxy I/O operations to complete the request. For an SCSI write, one or more of the above steps may be changed so that data flows from the initiator to temporary buffers in the primary node before being forwarded to the secondary node.

Each proxy I/O has the following overhead and latency problems: temporary buffer space must be allocated in the memory of the primary node; when insufficient temporary buffer space is available in the primary node, the proxy I/O sequence may need to be repeated with the same secondary node to retrieve all data that resides on the secondary target; all data transferred for a proxy command may need to be accumulated (ex.—stored in the temporary buffer space) on the primary node before being forwarded to its ultimate destination, the ultimate destination being the initiator when the initial I/O is a read I/O, the ultimate destination being the secondary node when the initial I/O is a write I/O; every transport Protocol Data Unit (PDU) used to transmit data, requests, or responses interrupts the primary storage node central processing unit (CPU). The accelerated I/O proxy technique of the present invention addresses the above-referenced overhead and latency problems.

Storage systems used for network attached storage may have dedicated I/O controllers which offload all or part of the protocol processing for the SAN's SCSI transport protocol. Two protocols which may benefit greatly from I/O controller offload may be iSCSI and iSCSI Extensions for RDMA (iSER). These session oriented protocols have three levels of processing that may be offloaded to an I/O controller. These include: byte processing, connection processing, and session processing. Byte processing may include all operations that must touch most or all bytes in a media transport protocol packet or SCSI transport protocol data unit. These may include Internet Protocol Security (IPSec) encryption, iSCSI digest calculations, and Transmission Control Protocol (TCP) checksums. Connection processing may include handling all iSCSI and iSER data movement protocol data units. This may include generating and receiving all iSCSI and iSER data movement operations such as Data-In, Data-Out, SNACK, R2T iSCSI protocol data units and the RDMARead, RDMAWrite, RDMAReadRequest, and RDMAReadResponse iSER RDMA packets. All data movement from memory and the SAN are handled by this layer/level. Session processing may include handling all iSCSI commands and responses that establish and manage iSCSI sessions. This may include login, logout, text negotiation, no-op, and task management iSCSI protocol data units. A driver organization for both an iSCSI or iSER protocol driver may move byte and connection processing to a separate I/O controller and keep session processing on the storage node's central processing unit. This may allow sessions to span connections from multiple I/O controllers for protocol error recovery and bandwidth aggregation. The above-described driver organization may eliminate all interrupts associated with individual data movement protocol data units.

In a driver with connection offload, the interaction between the session layer running on the storage controller/node CPU and the connection driver on the I/O controller may be defined in terms of the following operations. The session layer may send the following operations to the connection layer: sendPDU (ex.—send an iSCSI or iSER protocol data unit to the connection layer for transmission on the SAN); dataIn (ex.—request data be transferred from buffers on the storage node to the initiator over the SAN); dataOut (ex.—request data be transferred from the initiator to buffers on the storage node over the SAN). The connection layer may send the following events to the session layer: PDUrecv (ex.—send an iSCSI or iSER protocol data unit received from the SAN to the session layer); dataInComplete (ex.—inform session layer that a previously requested data transfer to the initiator is done); dataOutComplete (ex.—inform session layer that a previously requested data transfer from the initiator is done). A few additional operations and events may be needed to establish and close connections, but they are not involved in command request, data, and response processing. Once a connection is established, the iSCSI and/or iSER protocol may be implemented completely with these operations between the connection and session layers.

A straightforward implementation of proxy I/O for a storage cluster may be developed using the same operations as are used for non-proxy I/O. In this implementation, all proxy I/O changes may be concentrated in the session layer. Proxy I/O may create a link between two sessions for the duration of a proxy I/O operation. When implemented in the session layer, the communication between sessions is a command request, transfer of temporary buffers holding data, and a command response. The initiator session may be given additional information in the request to route temporary buffers and final status between sessions. Data flow for write ops in iSCSI may be similar to that for read ops in that, buffers are still allocated, but data is moved from proxy initiator to proxy initiator buffers, then transferred to the proxy target. This operation may be repeated if the temporary buffer space is smaller than the proxy I/O data range. For iSER, a proxy I/O may operate in a similar manner as for iSCSI. Further, proxyIO and proxyIOComplete operations may start and end a proxy I/O operation between the primary target session and the proxy initiator session. Instead of iSCSI Data-In and Data-Out PDUs, data may be transferred through the proxy initiator's temporary buffers using RDMA operations. Although this may enable proxy I/O for iSER, it also creates a store and forward delay in a protocol that uses RDMA operations to eliminate store and forward delays.

Proxy I/O may be done more efficiently when data is not placed into temporary buffers. To achieve this, the protocol packets that transfer data may be forwarded to their ultimate destination instead of placing data into temporary buffers. This may be achieved when proxy I/O is done at the connection layer instead of the session layer. In the present invention, maximum acceleration is promoted by offloading connection layer proxy operation to an I/O controller. To do this, the following primitive operations may be added to communication between the session layer and the connection layer. In an exemplary embodiment of the present invention, the session layer may send the following additional operations to the offload connection layer/connection layer: proxyDatain (ex.—start a connection level proxy I/O to transfer data from the proxy target to the primary initiator); and proxyDataOut (ex.—start a connection level proxy I/O to transfer data from the primary initiator to the proxy target). In current embodiments of the present invention, the offloaded connection layer may send the following additional events to the session layer: proxyDataInComplete (ex.—signal completion of a proxy-Datain operation); and proxyDataOutComplete (ex.—signal completion of a proxyDataOut operation). Further, the connection layer must have access to the session layer's iSCSI session sequence numbers. If offloaded, the connection layer must track the session level sequence numbers in all protocol packets that it receives from and sends to the session layer.

Referring generally to FIG. 1, a block diagram of a system 100 via which a method for performing an accelerated method of proxy I/O in accordance with an exemplary embodiment of the present invention is shown. The system 100 implements a target-based block storage cluster 102, such as described above. The target-based block storage cluster 102 may be configured for being communicatively coupled to a SAN 104, and may be further configured for being communicatively to an application server 106 via the SAN 104. The storage cluster 102 may include storage nodes (108, 110) which may be augmented with a virtualization layer 112 as described above. Further, a cluster manager 114 may reside directly on the storage nodes (108, 110) as described above. As previously discussed, a virtualization function (which includes the virtualization layer 112 and cluster manager 114) may combine storage resources/segments 116 on multiple storage nodes (108, 110) of the system 100 into a virtual volume(s) 118. Application(s) on the application server 106 may use the virtual volume(s) 118 as their storage resources.

Figure 2A:
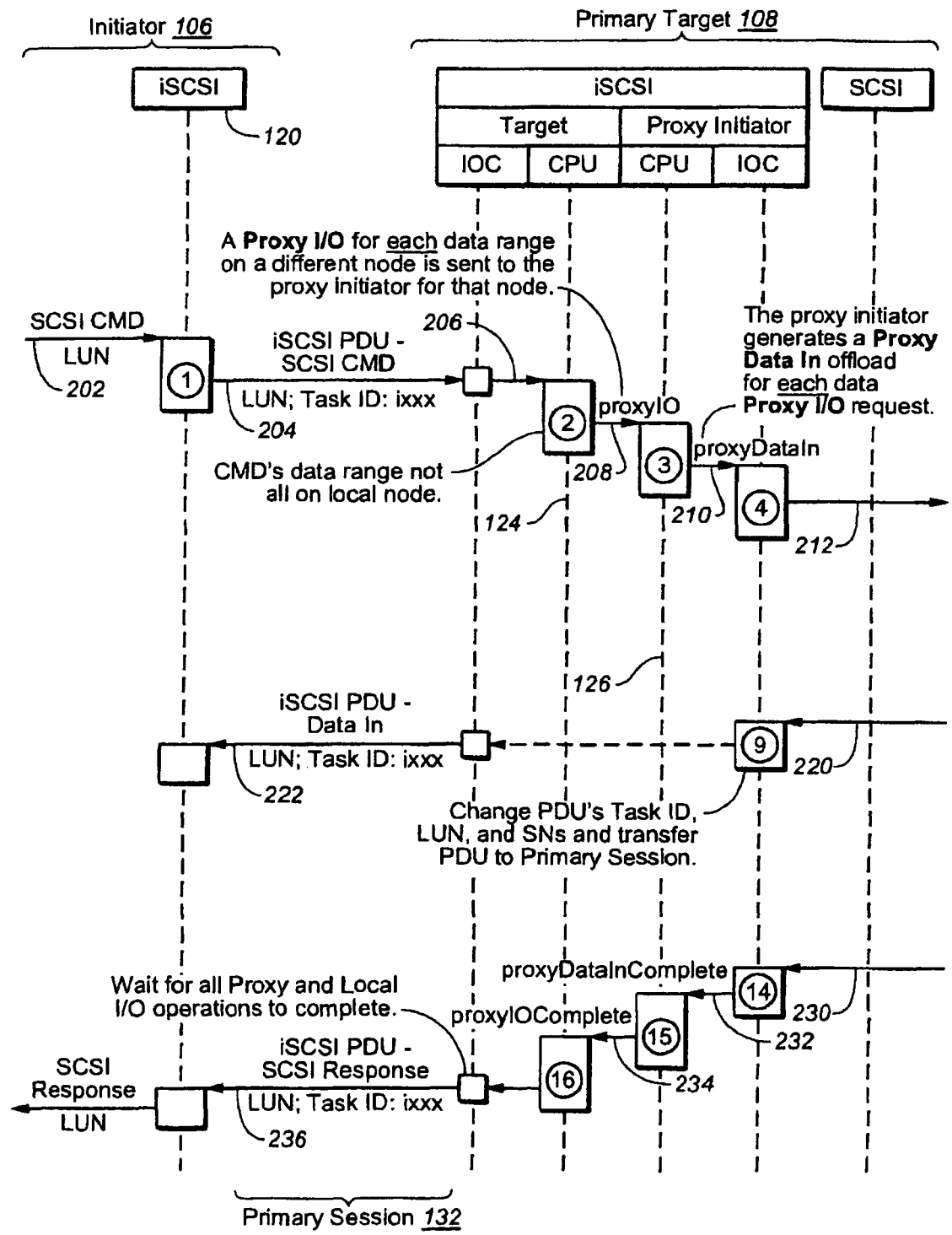
FIG. 2 is a block diagram schematic illustrating implementation of an accelerated method of proxy I/O (ex.—iSCSI proxy I/O) of the present invention on a storage system, such as on the target-based block storage cluster system 100 depicted in FIG. 1, and has been subdivided into FIG. 2A and FIG. 2B in order to provide additional detail.
Figures 2, 2B:
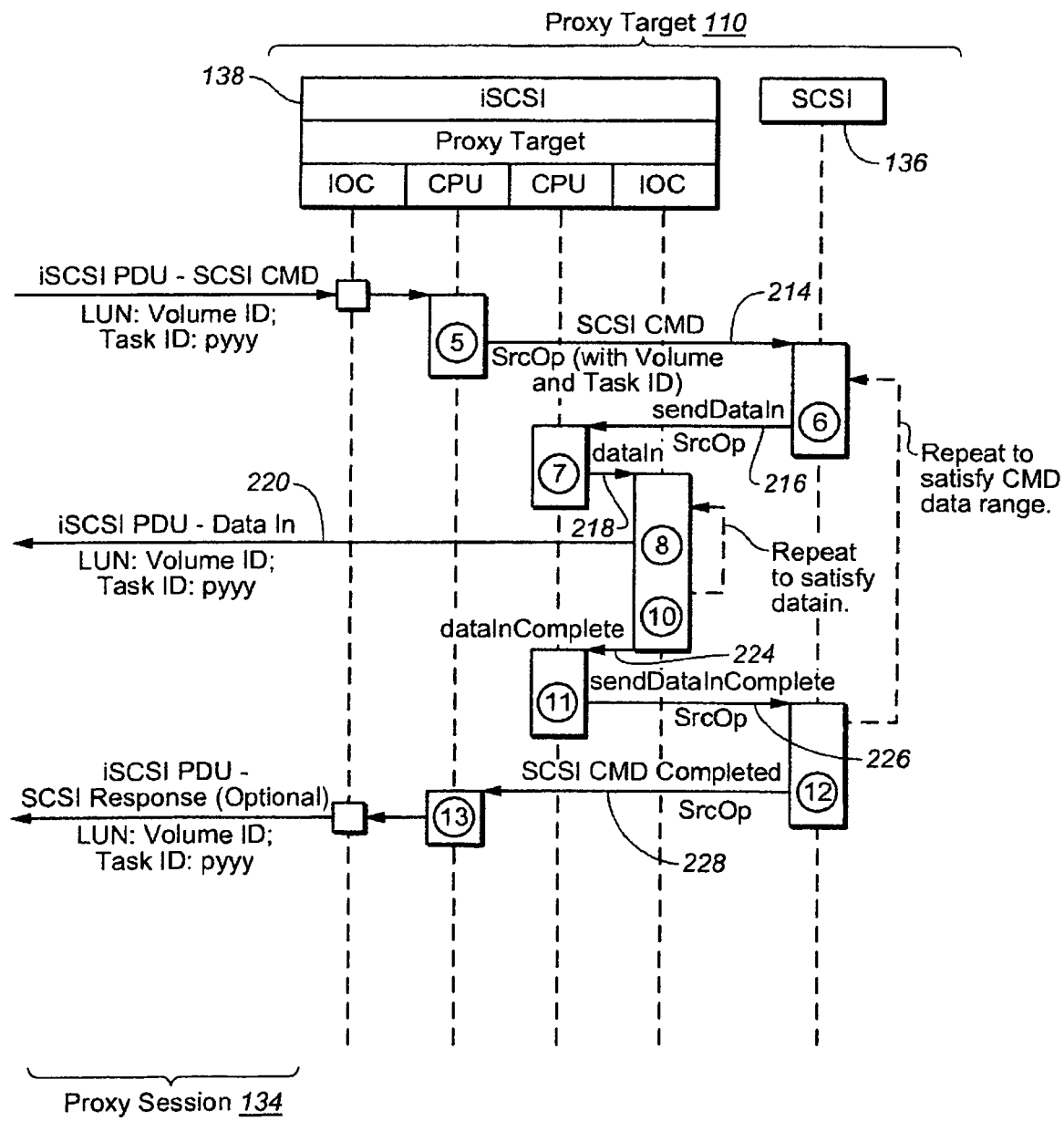

Referring generally to FIG. 2, a block diagram schematic illustrating implementation of an accelerated method of proxy I/O (ex.—iSCSI proxy I/O) of the present invention on a storage system, such as on the target-based block storage cluster system 100 depicted in FIG. 1, is shown. The block diagram schematic illustrates a detailed sequence for offload acceleration of proxy I/O using an iSCSI v 1.0 protocol read command in accordance with an exemplary embodiment of the present invention. In FIG. 2, iSCSI driver execution on the storage nodes is divided into two execution sequence lines to differentiate processing which occurs on the storage node from processing which occurs in the offloaded I/O controller. At the steps labeled 1-16, shown in FIG. 2, the following operations discussed below are performed.

In Step 1 (reference numeral 1 in FIG. 2), the following sub-steps may occur: an iSCSI driver 120 of an initiator (ex.—the application server 106 of FIG. 1) may receive a command from an SCSI target layer (sub-step labeled 202); the iSCSI driver 120 of the initiator 106 may encapsulate the command into an SCSI Command Request type iSCSI PDU and send the iSCSI PDU/SCSI Command Request to a primary target 108 (ex.—primary storage node) (sub-step 204); and the command request is received by the primary target/iSCSI primary target on the primary target storage node, the command is extracted from the command request (ex.—is extracted from a TCP/IP byte stream by an I/O controller ("IOC") of the primary target 108), the extracted command is forwarded to a session layer 124 of the primary target/primary iSCSI target 108 (sub-step 206).

In Step 2 (reference numeral 2 in FIG. 2), the following sub-steps may occur: a virtualization layer (such as virtualization layer 112 in FIG. 1) of the primary target 108 determines that all or part of the requested data requested in the command request is not resident on the primary storage node 108, the primary target session layer 124 is notified that the command requires proxy I/O, non-local data is then retrieved by generating new SCSI command(s) for the storage node(s) containing the data (such as storage node 110 in FIG. 1); proxy I/O data ranges are sent to the primary iSCSI target 108 to be linked to the original command and forwarded to iSCSI initiator(s)/iSCSI proxy initiator(s) with sessions open to the proxy storage nodes holding the required data as proxy I/O requests ("proxyI/O") (sub-step 208). Each proxy I/O request may include not only a data range for the needed data, but additional information about the session and connection on which the original command arrived so the data can be routed back to the initiator 106 that sent the original command.

In Step 3 (reference numeral 3 in FIG. 2), the following sub-steps may occur: a session layer 126 on the primary storage node of the proxy initiator receives the request to retrieve data from a different storage node (ex.—the proxy target, such as storage node 110 of FIG. 1), an iSCSI layer of the primary target 108 emits a proxyDataIn request to the I/O controller "IOC" of the proxy initiator to perform the operation (sub-step 210). The proxyDataIn request may include information for associating the primary connection and session 132 with the proxy connection and session 134, as well as a new task ID unique on the proxy session. The proxy SCSI command request may include a volume ID, offset, and length of data to be retrieved from the proxy target 110.

In Step 4 (reference numeral 4 in FIG. 2), the following sub-steps may occur: I/O controller "IOC" of the primary target 108 creates a command context indexed by proxy task ID, the I/O controller then creates a SCSI command for the data range, encapsulates it into an iSCSI PDU, and sends it to the proxy target 110 (sub-step 212), where it is received on the proxy target storage node. The command context may retain the primary session and connection on which the original command arrived at the primary target 108, as well as the LUN and task ID from said original command to allow for routing of data between the proxy and primary connections.

In Step 5 (reference numeral 5 in FIG. 2), the following sub-step(s) may occur: the proxy target 110 handles the command as a direct access to local data, the proxy SCSI request is extracted from the iSCSI PDU and is sent to the SCSI layer 136 of the proxy target 110 for processing (sub-step 214).

In Step 6 (reference numeral 6 in FIG. 2), the following sub-step(s) may occur: the SCSI layer 136 retrieves all or part of the data from a disk(s), provides a scatter/gather list of buffers containing the data, then sends a sendDataIn operation to the iSCSI layer 138 (sub-step 216). If this is the last set of data buffers for the transfer, the SCSI status is also sent with the sendDataIn operation.

In Step 7 (reference numeral 7 in FIG. 2), the following sub-step(s) may occur: the iSCSI session layer 140 of the proxy target 110 sends a dataIn operation to the proxy target I/O controller's connection layer 142 (sub-step 218), the dataIn operation containing the data scatter/gather list, the optional status, and information identifying the command which requested the transfer.

In Step 8, (reference numeral 8 in FIG. 2), the following sub-step(s) may occur: the I/O controller of the proxy target 110 generates one or more iSCSI Data-In PDUs to send data/and sends said iSCSI Data-In PDUs to the proxy initiator on the primary target storage node/primary target 108 (sub-step 220). If status was supplied with the data, the last iSCSI Data-In PDU in the sequence may also contain the phase collapsed status of the operation.

In Step 9, (reference numeral 9 in FIG. 2), the following sub-step(s) may occur: the iSCSI Data-In PDU(s) is/are received by the I/O controller's proxy initiator on the primary target/primary target storage node 108, the PDU(s) is/are routed to the proper connection of the primary session 132, and sent to the actual initiator/initiator 106 (sub-step 222). Before routing, the Logical Unit Number (LUN) and task ID of the PDU(s) is/are reset to values from the original command. The routed/re-routed PDU is also given the correct iSCSI sequence numbers for the primary session 132. Steps 8 and 9 described above may be repeated until all data for the dataIn operation has been transmitted from the proxy target 110 to the original initiator 106.

In Step 10, (reference numeral 10 in FIG. 2), the following sub-step(s) may occur: after all data has been transmitted and acknowledged, the I/O controller on the proxy target storage node sends a dataInComplete event to the iSCSI layer 138 on the proxy target 110 (sub-step 224).

In Step 11, (reference numeral 11 in FIG. 2), the following sub-step(s) may occur: the iSCSI layer 138 on the proxy target 110 sends a sendDataInComplete event to the SCSI layer (sub-step 226). Steps 6 through 11 may be repeated until all data requested by the SCSI command has been delivered to the iSCSI layer for transmission to the initiator.

In Step 12, (reference numeral 12 in FIG. 2), the following sub-step(s) may occur: the SCSI layer 136 of the proxy target 110 sends a SCSI command completed event with status information to the iSCSI layer 138 of the proxy target 110 (sub-step 228).

In Step 13, (reference numeral 13 in FIG. 2), the following sub-step(s) may occur: if the SCSI command status was not sent with the last iSCSI Data-In PDU, the proxy target completes the SCSI command by sending a SCSI Command Response type iSCSI PDU to the proxy initiator (sub-step 230).

In Step 14, (reference numeral 14 in FIG. 2), the following sub-step(s) may occur: when either the final Data-In PDU is acknowledged by the initiator or the SCSI Response type iSCSI PDU is received from the proxy target 110, the I/O controller sends a proxyDataInComplete event to the proxy initiator's iSCSI session layer 126 (sub-step 232). The proxyDataInComplete operation includes the proxy I/O data transfer status.

In Step 15, (reference numeral 15 in FIG. 2), the following sub-step(s) may occur: the proxy initiator sends a proxy IOComplete event to the primary target that requested the proxy I/O operation. (sub-step 234). The proxy IOComplete event may include a status of the proxy I/O operation.

In Step 16, (reference numeral 16 in FIG. 2), the following sub-step(s) may occur: if any SCSI CMD or proxyIO operations are still outstanding, the status of the just completed operation is saved, when the final SCSI command complete or proxyIOComplete event occurs, the final status of the data transfer is determined from the status of individual operations, any underflow or overflow are determined, the total residual count is determined, the primary target 108 then generates a SCSI Response type iSCSI PDU and sends it to the initiator 106 which sent the original command (sub-step 236). When the SCSI Response is acknowledged by the ExpStatSN on subsequent PDUs from the initiator 106, the context for the original SCSI command and its response are released.

A couple of key points in the above-referenced sequence (steps 1-16) are as follows: a) buffers are not needed on the primary target storage node to hold data as it is transferred from the proxy target 110 to the proxy initiator/primary target 108. Only a single interrupt is generated for the entire proxy data operation after all data has been transferred. The connection layer offload routes all iSCSI data transfer PDUs from the connection on the proxy session 134 to the connection on the primary session, and, updates the identifying fields in the packet headers. Data is never moved from packet buffers on the I/O controller.

The connection layer proxy I/O creates a temporary linkage between two connections, one from the primary session 132 and one from the proxy session 134. The connection layer proxy I/O saves all information about the primary session 132 and connection in its operation context, and sends a proxy I/O request to the proxy target 110. The secondary target/proxy target 110 receives the request and handles it as a normal I/O request. The proxy target 110 generates data in, ready to transmit, RDMA write, and RDMA read request protocol packets. Further, the proxy target 110 receives data out, RDMA read, and RDMA read response protocol packets appropriate for the iSCSI or iSER transport protocol. As each packet is received by the primary target and proxy initiator connections on the primary storage node 108, they are routed to the connection on the linked session and transmitted to their ultimate destination. During routing, the proxy initiator connection layer updates header fields in the protocol packet that are appropriate to the transport protocol so that the packets follow the proper sequencing numbers for their session and connection. The connection layer also updates all checksums appropriate for the transport protocol prior to forwarding the packet.

The accelerated method of proxy I/O (ex.—iSCSI proxy I/O) of the present invention transfers responsibility of performing proxy I/O from the session layer to the connection layer in the iSCSI protocol stack. The connection layer may have a number of additional responsibilities including: tracking the session layer sequence numbers (CmdSN, ExpCmdSN, and MaxCmdSN) of all iSCSI PDUs received and transmitted by the session layer; accepting a request from the proxy initiator session layer to perform a proxy I/O operation for a specific data range (ex.—separate requests may be done for inbound and outbound data ranges); linking the primary and proxy connections for the duration of the proxy I/O operation; generating or transferring the iSCSI SCSI Request PDU which contains the proxy I/O data request from the proxy initiator to the proxy target; routing data transfer protocol packets between the primary and proxy connections (ex.—packets routed from proxy to primary session include: iSCSI Data-In PDU, iSCSI R2T PDU, iSER RDMA Write, and iSER RDMA Read Request; while packets routed from primary to proxy session include: iSCSI Data-Out PDU, iSCSI SNACK PDU, iSER RDMA Read, and iSER RDMA Read Response); updating data identification and operation sequence numbers in the headers of packets routed between connections (ex.—header fields updated in iSCSI PDUs may include: LUN, Task ID, CmdSN, ExpCmdSN, and MaxCmdSN; while header fields updated in iSER PDUs may include: Source STag, Sink Stag, and Sink Tagged Offset); receiving or transferring the iSCSI SCSI Response PDU which contains the final status of the proxy I/O to the proxy initiator session layer; and signaling the completion of a proxy I/O operation when the final status is received (ex.—for iSCSI, the final status of a proxy I/O may be held in the final iSCSI Data-In PDU or may be returned in the iSCSI SCSI Response PDU; further, for iSCSI, the final status of a proxy I/O operation is always returned in the iSCSI SCSI Response PDU).

In further embodiments, the connection level proxy I/O operation may be performed on the storage node CPU if no connection offload is performed by an I/O controller. If an I/O controller is used, the connection level proxy I/O operation should also be offloaded to minimize the number of interrupts serviced by the storage node CPU for a proxy I/O operation.

Connection level proxy I/O, as performed by the method of the present invention, provides the following benefits over session level proxy I/O: intermediate proxy I/O buffers on the primary storage node are not required; the proxy I/O operation may be done with a single SCSI Request (instead of using multiple SCSI Requests matched to the allocated proxy I/O buffer size); the store and forward latency of moving data between the primary initiator and proxy target via proxy I/O buffers is eliminated. Further, in embodiments where the connection level proxy I/O is offloaded to an I/O controller, connection level proxy I/O of the present invention may be beneficial in that only a single interrupt is generated for the entire proxy I/O operation instead of an interrupt for every data transfer. The connection level proxy I/O technique of the present invention essentially converts the I/O controller into a data router for the proxy I/O command, making it seem to the initiator that the data is delivered from the original target with only a single extra network switch latency delay.

In alternative embodiments, when no I/O controller is available, connection level proxy I/O may still be implemented which: a) would not require immediate transfer buffers; and b) would allow for proxy I/O to be performed with one SCSI request. However, in these alternative embodiments (where no I/O controller is available), the same reduction in latency would not be present because the data would be moved to the storage node memory as an intermediate step instead of remaining in packet buffers. Further, in these alternative embodiments (where no I/O controller is available), the number of interrupts would not be reduced because every protocol packet would interrupt the storage node CPU.

In further alternative embodiments, the setup and completion of the proxy I/O operation may be modified. In one scenario, the session layer may separate and send the proxy I/O command separate from creating the proxy I/O data transfer context in the offloaded controller. However, in said scenario, the offloaded proxy I/O operation would still need to detect final status of the operation from the last iSCSI Data-In PDU and report it as a synthesized SCSI response. The SCSI response would then be sent up to the session layer. The proxy I/O data transfer context would then need to be terminated or completed by a call down from the session layer to the connection layer instead of an event in the other direction. Further, a different but equivalent set of API operations and events may be present, while providing similar benefits as the implementation/method shown in FIG. 2 above.

Figure 3:
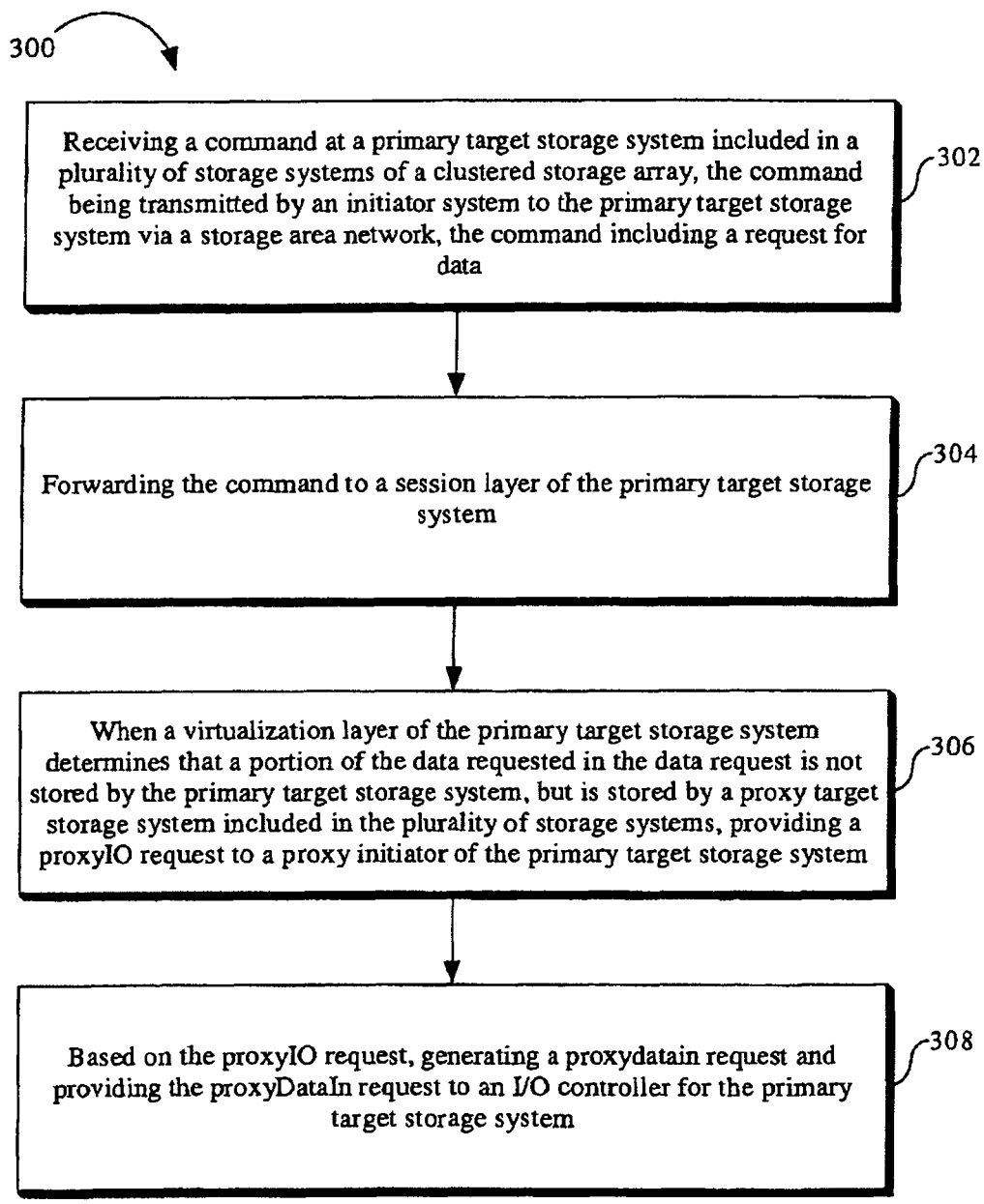
FIG. 3 is a flow chart illustrating a method for performing accelerated proxy I/O in accordance with an exemplary embodiment of the present invention.

Referring generally to FIG. 3, a method for performing accelerated proxy I/O in accordance with an exemplary embodiment of the present invention is shown. The method 300 may include receiving a command at a primary target storage system included in a plurality of storage systems of a clustered storage array 302. The command may be transmitted by an initiator system to the primary target storage system via a storage area network. The command including a request for data. The method 300 may further include forwarding the command to a session layer of the primary target storage system 304. When a virtualization layer of the primary target storage system determines that a portion of the data requested in the data request is not stored by the primary target storage system, but is stored by a proxy target storage system included in the plurality of storage systems, the method 300 may further include providing a proxyIO request to a proxy initiator of the primary target storage system 306. The method 300 may further include, based on the proxyIO request, generating a proxyDataIn request and providing the proxyDataIn request to an I/O controller for the primary target storage system 308.

In exemplary embodiments, the method 300 may further include, based on the proxyDatain request, creating a command context via the primary target storage system I/O controller 310. The command context may be indexed by proxy task ID. The method 300 may further include creating a Small Computer Systems Interface (SCSI) command via the primary target storage system I/O controller 312. The SCSI command may include a proxy SCSI request for said portion of the data. The method 300 may further include transmitting the SCSI command from the primary target storage system I/O controller to the proxy target storage system 314. The method 300 may further include receiving the SCSI command at the proxy target storage system and forwarding said SCSI command to a SCSI layer of the proxy target storage system 316. The method 300 may further include retrieving said portion of the data requested in the proxy SCSI request of the SCSI command 318. The method 300 may further include providing a list of buffers containing said portion of the requested data via the SCSI layer of the proxy target storage system 320.

The method 300 may further include providing a sendDataIn operation from the SCSI layer of the proxy target storage system to an internet SCSI (iSCSI) layer of the proxy target storage system 322. The method 300 may further include providing a dataIn operation from an iSCSI session layer of the proxy target storage system to a connection layer of an I/O controller of the proxy target storage system 324. The dataIn operation may include the list of buffers. The method 300 may further include generating an iSCSI Data-In Protocol Distribution Unit (iSCSI Data-In PDU) via the I/O controller of the proxy target storage system 326. The method 300 may further include transmitting the iSCSI Data-In PDU from the proxy target storage system to the proxy initiator of the primary target storage system 328. The iSCSI Data-In PDU may include said portion of the requested data. The method 300 may further include setting an Logical Unit Number (LUN) value and a task ID value included in the iSCSI Data-In PDU to same values as an LUN and a task ID included in the initiator system command 330. The method 300 may further include supplying iSCSI sequence numbers to the iSCSI Data-In PDU 332. The sequence numbers may be associated with a primary session.

The method 300 may further include routing the iSCSI Data-In PDU to a connection of the primary session 334. The method 300 may further include transmitting the iSCSI Data-In PDU to the initiator system 336. The method 300 may further include providing a dataInComplete event from the I/O controller of the proxy target storage system to the iSCSI layer of the proxy target storage system 338. The method 300 may further include providing a sendDataInComplete event from the iSCSI layer of the proxy target storage system to the SCSI layer of the proxy target storage system 340. The method 300 may further include sending a SCSI command completed event and status information from the SCSI layer of the proxy target storage system to the iSCSI layer of the proxy target storage system 342. The method 300 may further include, when a SCSI command status is not sent with the iSCSI Data-In PDU, providing an SCSI Command Response type iSCSI PDU to the proxy initiator of the primary target storage system 344. The method 300 may further include, when the SCSI Command Response type iSCSI PDU is received by the primary target storage system from the proxy target storage system, sending a proxyDataInComplete event from the I/O controller of the primary target storage system to an iSCSI session layer of the proxy initiator 346. The proxyDataInComplete event may include a proxy I/O data transfer status. The method 300 may further include sending a proxyIOComplete event to the primary target storage system 348. The method 300 may further include providing a SCSI Response type iSCSI PDU to the initiator system 350.

In further alternative embodiments, the above-referenced exemplary method(s), which describe acceleration of SCSI read operations, may be altered/adapted as necessary for allowing acceleration of SCSI write operations. Further, the above-referenced system(s)/method(s) for providing SCSI/iSCSI Proxy I/O acceleration may allow for acceleration of both read operations and write operations over the iSER protocol, which may perform data movement via RDMA protocols.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for accelerating proxy Input/Output (proxy I/O), comprising:
   receiving a command at a primary target storage system included in a plurality of storage systems of a target-based block storage cluster, the primary target storage system comprising a CPU, a first I/O controller communicatively coupled to an initiator system, and a second I/O controller communicatively coupled to a proxy target storage system, the command being transmitted by the initiator system to the primary target storage system via a storage area network, the command including a request for data;
   forwarding the command to a session layer of the primary target storage system;
   when a virtualization layer of the primary target storage system determines that a portion of the data requested in the data request is not stored by the primary target storage system, but is stored by the proxy target storage system included in the plurality of storage systems, the proxy target storage system comprising a CPU and an I/O controller for the proxy target storage system, providing a proxyIO request to a proxy initiator of the primary target storage system;
   based on the proxyIO request, generating a proxyDataIn request and providing the proxyDataIn request from the session layer of the primary target storage system to the second I/O controller;
   based on the proxyDataIn request, creating a command context via the second I/O controller, said command context being indexed by proxy task ID;
   requesting said portion of the data from the proxy target storage system; and
   providing, to the initiator system, a received response to the requesting, wherein the providing includes routing the response from the second I/O controller to the first I/O controller by a connection layer command.

2. A method as claimed in claim 1 wherein the requesting of said portion of the data includes:
   creating a Small Computer Systems Interface (SCSI) command via the second I/O controller, said SCSI command including a proxy SCSI request for said portion of the data.

3. A method as claimed in claim 2 wherein the requesting of said portion of the data further includes:
   transmitting the SCSI command from the second I/O controller to the proxy target storage system.

4. A method as claimed in claim 3 wherein the requesting of said portion of the data further includes:
   receiving the SCSI command at the proxy target storage system and forwarding said SCSI command to a SCSI layer of the proxy target storage system.

5. A method as claimed in claim 4, further comprising:
   retrieving the received response including said portion of the data requested in the proxy SCSI request of the SCSI command.

6. A method as claimed in claim 5, further comprising:
   providing a list of buffers containing said portion of the requested data via the SCSI layer of the proxy target storage system.

7. A method as claimed in claim 6, further comprising:
   providing a sendDataIn operation from the SCSI layer of the proxy target storage system to an interne SCSI (iSCSI) layer of the proxy target storage system.

8. A method as claimed in claim 7, further comprising:
   providing a dataIn operation from an iSCSI session layer of the proxy target storage system to a connection layer of the second I/O controller said dataIn operation including the list of buffers.

9. A method as claimed in claim 8, further comprising:
   generating an iSCSI Data-In Protocol Distribution Unit (iSCSI Data-In PDU) via the I/O controller for the proxy target storage system.

10. A method as claimed in claim 9, further comprising:
transmitting the iSCSI Data-In PDU from the proxy target storage system to the proxy initiator of the primary target storage system, the iSCSI Data-In PDU including said portion of the requested data.

11. A method as claimed in claim 10, further comprising:
setting an Logical Unit Number (LUN) value and a task ID value included in the iSCSI Data-In PDU to same values as an LUN and a task ID included in the initiator system command.

12. A method as claimed in claim 11, further comprising:
supplying iSCSI sequence numbers to the iSCSI Data-In PDU, said sequence numbers associated with a primary session.

13. A method as claimed in claim 12, further comprising:
routing the iSCSI Data-In PDU to a connection of the primary session at the connection layer.

14. A method as claimed in claim 13, further comprising:
transmitting the iSCSI Data-In PDU to the initiator system.

15. A method as claimed in claim 14, further comprising:
providing a dataInComplete event from the I/O controller for the proxy target storage system to the iSCSI layer of the proxy target storage system.

16. A method as claimed in claim 15, further comprising:
providing a sendDataInComplete event from the iSCSI layer of the proxy target storage system to the SCSI layer of the proxy target storage system;
sending a SCSI command completed event and status information from the SCSI layer of the proxy target storage system to the iSCSI layer of the proxy target storage system; and
when a SCSI command status is not sent with the iSCSI Data-In PDU, providing an SCSI Command Response type iSCSI PDU to the proxy initiator of the primary target storage system.

17. A method as claimed in claim 16, further comprising:
when the SCSI Command Response type iSCSI PDU is received by the primary target storage system from the proxy target storage system, sending a proxyDataIn-Complete event from the second I/O controller to an iSCSI session layer of the proxy initiator, the proxy-DataInComplete event including a proxy I/O data transfer status;
sending a proxyIOComplete event to the primary target storage system; and
providing a SCSI Response type iSCSI PDU to the initiator system.

18. A non-transitory computer-readable medium having computer-executable instructions for performing a method for accelerating proxy Input/Output (proxy I/O), said method comprising:
receiving a command at a primary target storage system included in a plurality of storage systems of a target-based block storage cluster, the primary target storage system comprising a CPU, a first I/O controller communicatively coupled to an initiator system, and a second I/O controller communicatively coupled to a proxy target storage system, the command being transmitted by the initiator system to the primary target storage system via a storage area network, the command including a request for data;
forwarding the command to a session layer of the primary target storage system;
when a virtualization layer of the primary target storage system determines that a portion of the data requested in the data request is not stored by the primary target storage system, but is stored by the proxy target storage system included in the plurality of storage systems, the proxy target storage system comprising a CPU and an I/O controller for the proxy target storage system, providing a proxyIO request to a proxy initiator of the primary target storage system;
based on the proxyIO request, generating a proxyDataIn request and providing the proxyDataIn request from the session layer of the primary target storage system to the second I/O controller;
based on the proxyDataIn request, creating a command context via the second I/O controller, said command context being indexed by proxy task ID;
requesting said portion of the data from the proxy target storage system; and
providing, to the initiator system, a received response to the requesting, wherein the providing includes routing the response from the second I/O controller to the first I/O controller by a connection layer command.

19. A storage system of a target-based block storage cluster communicatively coupled to an initiator system and to a target storage system, the storage system comprising:
a first input/output (I/O) controller communicatively coupled to the initiator system via a storage area network and operable to communicate with the initiator using at least an iSCSI protocol;
a first processor associated with the first I/O controller;
a second input/output (I/O) controller communicatively coupled to the target storage system and operable to communicate with the target storage system using at least an iSCSI protocol; and
a second processor associated with the second I/O controller,
wherein the storage system is operable to, upon determining that a first request received from the initiator system involves data stored by the target storage system:
provide, to the second I/O controller, information identifying a session between the initiator system and the first I/O controller;
create, by the second I/O controller, a second request for the data stored by the target storage system;
create, by the second I/O controller, a command context relating the second request to the session; and
forward a response to the second request received from the target storage system to the initiator system by modifying the response according to the command context, providing the modified response from the second I/O controller to the first I/O controller via a connection layer command, and providing the modified response from the first I/O controller to the initiator system via the session.

20. The method of claim 1, wherein the requesting of said portion of the data includes:
receiving an iSCSI Data-In Protocol Distribution Unit (PDU) received from the proxy target storage system in response to the proxyIO request; and
routing the iSCSI Data-In PDU from the second I/O controller of the primary target storage system communicatively coupled to the proxy target storage system to the first I/O controller of the primary target storage system communicatively coupled to the initiator system, wherein the routing is performed entirely at the connection layer.

* * * * *